(12) United States Patent
Samain et al.

(10) Patent No.: US 9,193,851 B2
(45) Date of Patent: Nov. 24, 2015

(54) CELLULOSE-BASED COMPOSITE MATERIALS

(75) Inventors: Daniel Samain, Meylan (FR); Camelia Stinga, Grenoble (FR)

(73) Assignee: Centre National de la Recherche Scientifique (FR)

( * ) Notice: Subject to any disclaimer, the term of this patent is extended or adjusted under 35 U.S.C. 154(b) by 390 days.

(21) Appl. No.: 13/809,619

(22) PCT Filed: Jul. 8, 2011

(86) PCT No.: PCT/EP2011/061674
§ 371 (c)(1),
(2), (4) Date: Mar. 4, 2013

(87) PCT Pub. No.: WO2012/007397
PCT Pub. Date: Jan. 19, 2012

(65) Prior Publication Data
US 2013/0199409 A1   Aug. 8, 2013

(30) Foreign Application Priority Data

Jul. 13, 2010  (FR) ..................... 10 55713

(51) Int. Cl.
| C08L 97/02 | (2006.01) |
| C08L 1/12 | (2006.01) |
| C08J 7/12 | (2006.01) |

(Continued)

(52) U.S. Cl.
CPC .. *C08L 1/12* (2013.01); *C08J 5/045* (2013.01); *C08J 5/06* (2013.01); *C08J 7/12* (2013.01); *C08J 7/14* (2013.01); *C08L 1/10* (2013.01); *C08L 1/14* (2013.01); *C08L 97/02* (2013.01); *D06M 13/188* (2013.01); *C08J 2301/00* (2013.01); *C08J 2301/10* (2013.01); *C08J 2301/12* (2013.01); *C08J 2301/14* (2013.01); *C08J 2397/02* (2013.01); *C08L 2205/16* (2013.01); *D06M 2101/06* (2013.01)

(58) Field of Classification Search
CPC .......... C08L 97/02; C08L 5/045; C08L 5/06; C08L 7/12; C08L 11/16; C08L 2397/00; C08L 2401/10; C08L 2401/12; C08L 2666/26; C08J 5/06; C08J 5/045; C08J 7/12; C08J 7/14; C08J 2301/10; C08J 2301/12; C08J 2301/14; C08J 2397/02

See application file for complete search history.

(56) References Cited

U.S. PATENT DOCUMENTS

| 2,535,919 A | 12/1950 | Heppey et al. |
| 2,772,944 A | 12/1956 | Allewelt |

(Continued)

FOREIGN PATENT DOCUMENTS

| DE | 29522229 U1 | 1/2001 |
| FR | 519822 A | 6/1921 |

(Continued)

OTHER PUBLICATIONS

Glasser et al, "Fiber-Reinforced Cellulosic Thermoplastic Composites", Journal of Applied Polymer Science, vol. 73, pp. 1329-1340 (1990).*

(Continued)

*Primary Examiner* — David M Brunsman
(74) *Attorney, Agent, or Firm* — Banner & Witcoff, Ltd.

(57) ABSTRACT

New cellulose-based composites and production methods thereof, comprising partial peracetylation of cellulose fibers having a degree of crystallinity less than 80%.

14 Claims, 2 Drawing Sheets

Figure 1:
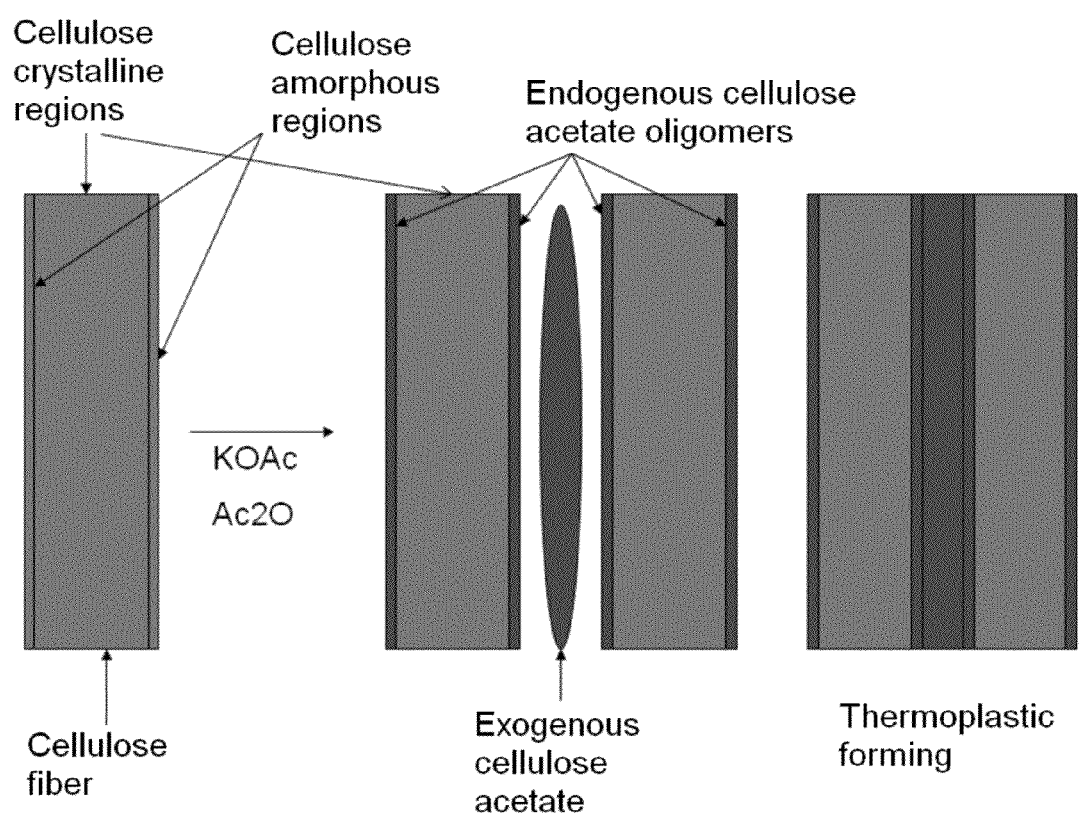

(51) Int. Cl.
    C08J 5/06     (2006.01)
    C08J 7/14     (2006.01)
    C08J 5/04     (2006.01)
    C08L 1/10     (2006.01)
    C08L 1/14     (2006.01)
    D06M 13/188   (2006.01)
    D06M 101/06   (2006.01)

(56) References Cited

U.S. PATENT DOCUMENTS

| 6,361,862 B1 | 3/2002 | Kim et al. |
| 2003/0124937 A1 | 7/2003 | Williams |

FOREIGN PATENT DOCUMENTS

| GB | 570529 A | 7/1945 |
| JP | 35013248 B4 | 9/1960 |

OTHER PUBLICATIONS

Glasser and Wright, "Steam-Assisted Biomass Fractionation . . . ", Biomass and Bioenergy, vol. 14, No. 3, pp. 219-235, (1998).*
French Search Report issued from corresponding FR 1055713, dated Feb. 24, 2011.
International Search Report issued from corresponding PCT/EP2011/061674, dated Oct. 11, 2011.
Barud, Hernane S., et al.,"Thermal behavior of cellulose acetate produced from homogeneous acetylation of bacterial cellulose," Thermochimica Acta, 2008, pp. 61-69, vol. 471, Elsevier B.V.
Berlioz, Sophie, et al.,"SFGP 2007—Investigation of a Novel Principle of Chemical Grafting for Modification of Cellulose Fibers," International Journal of Chemical Reactor Engineering, 2008, pp. 1-14, vol. 6, article A2, The Berkeley Electronic Press.
Cerqueira, Daniel Alves, et al.,"Characterization of cellulose triacetate membranes, produced from sugarcane bagasse, using PEG 600 as additive," Polymer Bulletin, 2008, pp. 397-404, vol. 60, Springer-Verlag.
Dufresne, Alain,"Polysaccharide nanocrystal reinforced nanocomposites," Can. J. Chem., 2008, pp. 484-494, vol. 86, NRC Research Press.
Favier, V., et al.,"Polymer Nanocomposites Reinforced by Cellulose Whiskers," Macromolecules, 1995, pp. 6365-6367, vol. 28, American Chemical Society.
Fraizy, J.,"des fibres de cellulose regeneree et notamment des polynosiques," Teintex, 1966, pp. 781-790, No. 11.
Hajji, P., et al.,"Tensile Behavior of Nanocomposites from Latex and Cellulose Whiskers," Polymer Composites, 1996, pp. 612-619, vol. 17, No. 4.
Helbert, W., et al.,"Thermoplastic Nanocomposites filled with Wheat Straw Cellulose Whiskers. Part I: Processing and Mechanical Behavior," Polymer Composites, 1996, pp. 604-611, vol. 17, No. 4.
Koh, Joonseok, et al.,"Dyeing Properties of Novel Regenerated Cellulosic Fibers," Journal of Applied Polymer Science, 2004, pp. 3481-3488, vol. 91, Wiley Periodicals, Inc.
Lonnberg, Hanna, et al.,"Surface grafting of microfibrillated cellulose with poly(•-caprolactone)—Synthesis and characterization," European Polymer Journal, 2008, pp. 2991-2997, vol. 44, Elsevier Ltd.
Ly, B., et al.,"Surface functionalization of cellulose fibres and their incorporation in renewable polymeric matrices," Composites Science and Technology, 2008, pp. 3193-3201, vol. 68, Elsevier Ltd.
Malm, Carl J., et al.,"Preparation of Cellulose Acetate," Industrial and Engineering Chemistry, 1946, pp. 77-82, vol. 38, No. 1, American Chemical Society.
Nishino, Takashi, et al.,"All-Cellulose Composite Prepared by Selective Dissolving of Fiber Surface," Biomacromolecules, 2007, American Chemical Society.
Petersson, L., et al.,"Structure and thermal properties of poly(lactic acid)/cellulose whiskers nanocomposite materials," Composites Science and Technology, 2007, pp. 2535-2544, vol. 67, Elsevier Ltd.
Sassi, Jean-Francois, et al.," Ultrastructural aspects of the acetylation of cellulose," Cellulose, 1995, pp. 111-127, vol. 2, Blackie Academic & Professional.
Seavey, Kevin C., et al.,"Continuous cellulose fiber-reinforced cellulose ester composites. II. Fiber surface modification and consolidation conditions," Cellulose, 2001, pp. 161-169, vol. 8, Kluwer Academic Publishers.
Zugenmaier, Peter, "Characteristics of Cellulose Acetates," Macromol. Symp., 2004, pp. 81-166, vol. 208, Wiley-VCH Verlag GmbH & KGaA, Weinheim.

* cited by examiner

CELLULOSE-BASED COMPOSITE MATERIALS

RELATED APPLICATION DATA

This application is a National Stage Application under 35 U.S.C. 371 of co-pending PCT application PCT/EP2011/061674 designating the United States and filed Jul. 8, 2011; which claims the benefit of FR patent application number 1055713 and filed Jul. 13, 2010 each of which are hereby incorporated by reference in their entireties.

The present invention concerns novel cellulose/cellulose composites and manufacturing methods thereof.

Thermoplastic composites are conventionally made with a mixture of reinforcing fibers (glass, Kevlar, etc.) and a thermoplastic matrix. The field of thermoplastics offers many examples of substituting cellulose fibers for mineral fibers (Michaud, F. 2003). The mechanical property requirements are, in fact, less than in the case of thermosetting materials and the problems of water sensitivity associated with the hydrophilic nature of cellulose fibers may be overcome by a strategy of encapsulating the fibers with a polymer matrix. This operation is made possible by the current low cost of polymer matrices, but this situation may change with long-term changes in oil prices. The results obtained are mediocre, however, mainly due to the poor compatibility between the hydrophilic surface of the fibers and the hydrophobic polymer matrix. Furthermore, if this strategy is used with petrochemical polymer matrices, it only results in mixed semi-natural, semi-synthetic materials, while it would be much more useful, in the context of sustainable development, to prepare composites that are entirely of natural origin by using thermoplastic matrices of renewable origin.

Among the polymer matrices of renewable origin usable for thermoplastic applications, there is one that particularly stands out, cellulose acetate (Zugenmaier, P. 2004). This compound already has a long history as a thermoplastic and it is still an important industrial product in the field of membranes (Cerqueira, D. A., et al. 2008) and cigarette filters, in particular. Actually, it is a family of products, since compounds of cellulose propionate, butyrate and acetate butyrate are also sold. Cellulose acetates are not considered truly biodegradable which, in many cases is an advantage, but they are clearly recyclable by conventional alkaline regeneration of cellulose acetate into cellulose. This regeneration is particularly interesting in the case of cellulose materials because recycling of printed paper precisely takes place under alkaline conditions. These compounds are therefore extremely attractive for use as a thermoplastic matrix as long as the problem of the compatibility of the cellulose acetate/cellulose fiber interface is solved. In fact, although they are both made of cellulose, these two materials do not have the same chemical and physicochemical properties and they are actually very poorly compatible in principle.

The conventional use of plant cellulose materials as a filler for cellulose acetate is, for example, described in patent of invention FR 519 822. However, cellulose fibers and cellulose acetate have a very poor compatibility.

Document GB 570,529 describes a powder for molding containing a synthetic resin and cellulose acetate fibers. Cellulose acetate fibers have been obtained by partial acetylation of cellulose under fibrous conditions to maintain the fiber structure. This document essentially concerns the substitution of cellulose reinforcing fibers by acetylated cellulose reinforcing fibers. This document does not specify the nature of the synthetic resin used.

Document DE 295 22 229 describes a material based on cellulose acetate and natural cellulose fibers. Cellulose fibers are used without any special pretreatment and the relative incompatibility of cellulose fibers and the cellulose acetate matrix is therefore not resolved.

Patent application US 2003/0124937 describes a material containing native cellulose fibers and cellulose ester fibers. This material does not comprise a thermoplastic matrix in which the reinforcing fibers are dispersed.

A first approach to resolve this problem of compatibility of the reinforcing fibers and the thermoplastic matrix was developed via acetylation of cellulose whiskers (Sassi, J.-F. 1995). The potential of whiskers as nanoscale reinforcing structures for improving the mechanical properties of thermoplastic composites is, in fact, currently widely recognized (Dufresne, A. 2008, Favier, V., Chanzy, H., et al. 1995, Hajji, P., et al. 1996, Helbert, W., et al. 1996, Petersson, L., et al. 2007). Whiskers are cellulose nanocrystals obtained by acid hydrolysis conducted on cellulose fibers. Due to their strongly hydrophilic nature, these composites are still tricky to handle and disperse in hydrophobic media (Petersson, L., Kvien, I., et al. 2007). It was therefore tempting to take advantage of the large surface area of whiskers to acetylate them on the surface in order to make them compatible with cellulose acetate matrices. The results obtained actually showed a clear improvement in the dispersion properties. In contrast, the mechanical properties are scarcely improved at all. Our hypothesis is that these results can be interpreted by assuming that the conditions used by Sassi for whisker acetylation induce a cleavage of the oligomer chain of the cellulose acetate in formation. As a result, acetylated whiskers only have very short cellulose acetate oligomer chains on their surface. Yet we know from the work of Lönnberg (Lönnberg, H., et al. 2008) that the dispersion properties and mechanical properties of microfibrils dispersed in an organic polymer can only be improved by covalent grafting of polycaprolactone oligomer of sufficient molecular weight to the microfibril surface. Our hypothesis is therefore that the cellulose acetate oligomer chains present on the whisker surface would not be long enough to effectively interact with the cellulose acetate matrix. In fact, Sassi reports that the results obtained with acetylated microfibrils by using trifluoroacetic anhydride as activator, i.e., leading to fewer cleavage reactions for the cellulose acetate chains in formation, would give slightly better results than those obtained with whiskers. We can therefore speculate that one way to substantially improve the mechanical properties of composites using cellulose fibers as reinforcers could be to graft side chains around the cellulose fibers of a sufficiently close chemical nature and sufficient molecular weight to effectively interact with the cellulose acetate chains of the exogenous polymer matrix (Ly, B., et al. 2008).

In order to try to provide a solution to this problem, another difficulty should also be noted, which appears in cellulose fibers used as reinforcers for composite materials. This difficulty, which we have already mentioned, is related to the dimensional instability of the fibers in the presence of water. When this dimensional instability is analyzed with regard to what we know about the structure of cellulose fibers, it appears that this instability is related to the presence of amorphous cellulose regions surrounding the crystalline regions and connecting them together. Highly structured crystalline regions are characterized by very strong hydrogen bonds that cannot be displaced by water, while amorphous regions are characterized by weak hydrogen bonds that can be displaced by water. The entire concept underlying the use of whiskers comes from this perception of the dual structure and the desire to eliminate the amorphous parts of the fiber to obtain the most perfect nanocrystals possible and hence the strongest and least sensitive to the presence of water.

This is where the invention comes in. Instead of actually trying to solve the problem of the dimensional instability by eliminating the amorphous parts of the fibers by acid hydrolysis or the like, the invention consists of making them lose their sensitivity to water by taking advantage of their obviously higher chemical reactivity and by transforming them via an appropriate chemical change into oligomers of cellulose acetate of high molecular weight that can effectively interact with a polymer matrix of cellulose acetate. This operation would not make sense, however, if the oligomers thus synthesized were then detached from the structure of the fiber due to the chemical change in question. In fact, it is vital that the chains of cellulose acetate oligomers formed remain firmly bound by covalent bond to the main structure of the fiber.

It is therefore vital to choose mild acylation conditions preserving the glycosidic bonds of the cellulose or, in other words, not leading to hydrolysis of these cellulose molecules.

Various acylation or acetylation processes for cellulose are known from the prior art. Acylation of cellulose is generally conducted in the presence of a catalyst such as a strong acid. This acylation leads not only to acylating the cellulose, but also to cutting the cellulose fibers. The product obtained— typically cellulose acetate—thus has a reduced DP due to the hydrolysis of the cellulose molecules. It therefore becomes soluble in organic solvents such as chloroform or acetone while cellulose is not soluble in these solvents. This acylation may also take place under fibrous conditions. In all cases, however, acylation is accompanied by hydrolysis of the cellulose molecules.

U.S. Pat. No. 2,772,944 discusses the difficulty of acetylating cellulose on the surface while maintaining its fibrous structure. This document describes a process comprising impregnating the fibers with glacial acetic acid then reacting with acetic anhydride in the presence of perchloric acid. This acetylation under fibrous conditions leads, however, to partial lysis of the cellulose fibers.

Document U.S. Pat. No. 2,535,919 mentions that cellulose fibers contain both amorphous cellulose and crystalline cellulose and this document describes the partial acetylation of these cellulose fibers. However, the acetylation conditions include impregnating the fibers with glacial acetic acid and then reacting with acetic anhydride in the presence of a strong acid. This acetylation is conducted under fibrous conditions in the absence of solvent, but these are still "harsh" acetylation conditions, causing the cellulose chains to be cut. This is illustrated by the fact that the cellulose acetate formed is soluble in the methylene chloride used in this document to make the fibers adhesive.

The acylation process used in the present invention relies on an activation and selective acylation of amorphous regions of cellulose fibers under conditions preserving the glycosidic bonds of the cellulose molecules. These conditions have already been described in the literature (Fraizy, J. 1966, Nagai, K. and Saito, M. 1960).

However, to arrive at the results of the present invention, it is not enough to simply use conditions for chemical change that do not lead to cutting the glycosidic bonds, it is still necessary that the cellulose molecular chains that are part of the amorphous regions are partially in the crystalline form. The cellulose molecules themselves must also have crystalline regions and amorphous regions.

To our great surprise, by taking a model of particularly non-crystalline cellulose fibers, rayon fibers, where we had the most chance of finding cellulose molecular chains entirely located in the amorphous regions, we observed that the great majority of molecular chains have segments present in both the crystalline and amorphous regions.

In order to verify this point, we subjected rayon fibers to a particular acetylation treatment relying on specific and quantitative activation of cellulose hydroxyls present in the amorphous regions and not leading to reactions where glycosidic bonds are cut (Fraizy, J. 1966, Nagai, K. and Saito, M. 1960). This treatment therefore normally leads to quantitative acetylation of all the hydroxyls present in the amorphous regions. After treatment, we weighed the samples and verified that the weight of these samples actually increased by 38%, in compliance with the known degree of crystallinity of rayon fibers, i.e., 50%. We then extracted fibers treated with chloroform, which is a solvent known for its properties of solubilizing cellulose triacetate oligomers, which is the species synthesized under our conditions. To our great surprise, the quantities of triacetate that we were able to extract were very low, less than 4%. The IR spectra done before and after washing with chloroform are also superimposable, which clearly indicates that the great majority of cellulose acetate oligomers indeed remain associated with the fiber structure.

This result unambiguously indicates that cellulose molecular chains have segments belonging to crystalline and amorphous regions and that the acetylation conditions such as we used led to a supramolecular assembly with, on the one hand, all the non-derived crystalline regions and on the other hand, cellulose acetate oligomer chains bound to these crystalline regions by the glycosidic bonds that previously connected the various crystalline and amorphous segments of the cellulose molecular chains.

The invention therefore consists of meeting two important objectives by conducting a single key operation, peracetylation of all the amorphous regions of the cellulose fibers. This modification actually allows eliminating the dimensional sensitivity of cellulose fibers by transforming hydrophilic amorphous regions into nonpolar hydrophobic regions (40% reduction of the acetylated fiber water uptake). Thus, cellulose acetate oligomers are generated that represent between 30 and 50% of the initial cellulose material. These oligomers obtained without any cutting of glycosidic bonds therefore necessarily have a high molecular weight and will thus be able to establish a very high-quality interaction with cellulose acetate matrices. In the extreme, it is even possible to fuse fibers whose amorphous parts have been acetylated without having to add exogenous cellulose acetate. The invention thus relies on the use of native cellulose fibers, preferably whiskers or microfibrils, which are not only complex and expensive to produce, but which, by definition have lost this amorphous cellulose that we are especially benefiting from.

The quality of the compatibility obtained by acetylation of amorphous regions with regard to cellulose acetate thermoplastic matrices was determined by dispersion tests of partially acetylated fibers in cellulose acetate matrices.

The results obtained indicate that native rayon fibers are not at all dispersed in cellulose acetate, where they are present in the form of entangled fiber clusters. On the contrary, acetylated fibers are able to disperse in this cellulose acetate matrix, even appearing to melt into this matrix. However, this is only an optical illusion, since extracting the cellulose acetate matrix by chloroform clearly regenerated the initial fibers. Analysis of the surface of the composite edge, acetylated fibers/cellulose acetate under the electron microscope confirms the good quality of the fiber/matrix interface.

The improvement in mechanical properties was determined by measuring Young's modulus which shows a significant increase of 21%.

The quality of compatibility obtained was also characterized by the regeneration of composite fibers of acetylated cellulose/cellulose acetate in basic medium. Indeed, we know that it is possible to regenerate cellulose II by alkaline treatment of cellulose acetate. This is the process for obtaining Fortisan fibers (Kim, I. S., et al. 2002, Koh, J., et al. 2004).

In our case, electron microscope analysis of the fracture surfaces after alkaline treatment clearly shows total disappearance of the fiber/matrix interface, while this interface is very visible if non-acetylated cellulose fibers dispersed in cellulose acetate and subject to regeneration by alkaline treatment.

Interestingly, the co-regeneration of acetylated fiber/cellulose acetate composites itself leads to original materials, which are thermostable cellulose/cellulose composites.

Thermostable composites are conventionally obtained by in situ polymerization processes and lead to assemblies crosslinked in three dimensions. One major drawback of these composites is their nearly complete lack of recycling properties (beyond thermal recovery or to make fillers).

The non-recyclability of these composites is linked to the fact that the crosslinking bonds are covalent and it is practically impossible to break them.

However, recyclable thermostable composites already exist. These composites are prepared from cellulose matrices reinforced by cellulose fibers. They are prepared, for example, by using the cellulose solvent power of certain solutions such as DMAc/LiCl. Since solubilization is a progressive phenomenon, it is enough to block it by dilution at the end of a specific period, thus leading to a cellulose/cellulose composite in which the fibers not yet solubilized are the reinforcing part and the matrix is made up of regenerated cellulose. These cellulose/cellulose composites are characterized by the fact they are no longer crosslinked via irreversible covalent chemical bonds, but by means of reversible hydrogen bonds. There is no chemical denaturation of the cellulose macromolecules, which thus conserve their biodegradability and recyclability properties. However, according to the studies described in the literature, (Nishino, T. and Arimoto, N. 2007), it is a phenomenon that is difficult to control and whose industrialization is difficult to envisage due to the time necessary for molding the parts. Indeed, it is necessary to keep the sample compressed throughout the elimination of the solvent.

The method that we propose enables real industrial implementation to be envisaged. The benefit of preparing these thermostable composites by this method comes from the fact that the precursor composites are thermoplastic composites that can therefore be prepared industrially with conventional tools. The improvement in mechanical properties was measured by the significant increase in the Young's modulus of 25%.

The method that we are proposing also allows preparing thermostable composites that are not completely saponified with different properties, such as reduced dimensional instability or greater plasticity associated with the presence of residual acetates.

SUMMARY OF THE INVENTION

The present invention relates to methods for producing a cellulose-based composite material, characterized in that it comprises the following steps:
a) Providing cellulose fibers comprising crystalline regions and at least 20% of amorphous regions.
b) Activation of the amorphous regions of the cellulose fibers by alkaline treatment,
c) Selective acylation of the amorphous regions of the cellulose fibers by low molecular weight fatty acids chosen from among acetate, propionate, butyrate and their mixtures, under reaction conditions preserving the glycosidic bonds of the cellulose, until cellulose fibers having a degree of acylation comprised between 10% to 50% by mass are obtained,
d) Addition of a thermoplastic polymer matrix chosen from among cellulose acetates, cellulose propionates, cellulose butyrates, cellulose acetate butyrates and mixtures thereof,
e) Optionally, forming of the composite material obtained in the preceding step by hot molding, injection molding and/or hot compression.

In one embodiment, the activation of the amorphous regions of cellulose fibers by an alkaline treatment is done with an alkaline aqueous solution of sodium hydroxide or potassium hydroxide.

In another embodiment, the activation of the amorphous regions of cellulose fibers by an alkaline treatment is done with a potassium acetate or sodium acetate.

Preferably, acylation of the amorphous regions of the cellulose fibers consists of contacting cellulose fibers with an acylation agent under neutral conditions.

In preferred embodiments, the acylation agent is chosen from among acetic anhydride, butyric anhydride, propionic anhydride, mixed anhydrides, acetic acid chloride, propionic acid chloride, butyric acid chloride, activated acetates, activated propionates, activated butyrates and mixtures thereof.

In one preferred embodiment, step d) consists of the addition of 1% to 50% by weight of thermoplastic matrix with regard to the weight of the cellulose fibers.

In a second embodiment, step d) comprises an immersion of the cellulose fibers in the form of braided yarn in the matrix followed by drying the fibers.

In a third embodiment, step d) comprises dispersing the cellulose fibers in the thermoplastic matrix.

Preferably, cellulose fibers are chosen from among fibers of rayon, abaca, bamboo, hemp, coir from coconut, cotton from the seed, broom, Spanish broom, yucca, jute, kapok, kenaf, flax, manila, nettle, straw, ramie, raffia, sisal or mixtures thereof.

In one preferred embodiment of the invention, the cellulose fibers are rayon fibers and the thermoplastic polymer matrix is cellulose triacetate.

In one particular embodiment of the invention, the method also comprises a step of partial or total saponification of the cellulose-based composite material obtained in step d) or step e).

Preferably, saponification comprises treating the material with a solution of sodium hydroxide followed by washing and drying of the material.

The invention also relates to a thermoplastic cellulose-based composite material that can be obtained by the process according to the invention.

The invention also relates to a recycling process for a thermoplastic cellulose-based composite material in which the material is subjected to complete acetylation in the presence of a strong acid.

The invention also relates to a thermoplastic cellulose-based composite material that can be obtained by the process according to the invention comprising a saponification step.

The subject of the invention is a cellulose-based composite material comprising:
Cellulose fibers comprising crystalline regions and at least 20% of amorphous regions, at least 80% of these amorphous regions being acylated by low molecular weight fatty acids chosen from among acetate, propionate, butyrate and mixtures thereof;

A compatible thermoplastic polymer matrix chosen from among cellulose acetates, cellulose propionates, cellulose butyrates, cellulose acetate butyrates and mixtures thereof.

Preferably, the cellulose-based composite material comprises 1% to 50% by weight of thermoplastic matrix.

Preferably, the cellulose-based composite material comprises 50% to 99% by weight of cellulose fibers.

In preferred embodiments, the cellulose fibers are chosen from among fibers of rayon, abaca, bamboo, hemp, coir from coconut, cotton from the seed, broom, Spanish broom, yucca, jute, kapok, kenaf, flax, manila, nettle, straw, ramie, raffia, sisal or mixtures thereof.

In one advantageous embodiment, the cellulose-based composite material comprises partially acetylated rayon fibers with a degree of acetylation comprised between 20% and 40% by mass.

Preferably, the thermoplastic polymer matrix is cellulose triacetate.

In some embodiments, the composite material is at least partially saponified.

Another subject of the invention is a production method for a cellulose-based composite material comprising the following steps:

a) Partial acylation of cellulose fibers by low molecular weight fatty acids chosen from among acetate, propionate, butyrate and mixtures thereof, said cellulose fibers comprising crystalline regions and at least 20% of amorphous regions, under mild reaction conditions leading to acetylation of at least 80% of the amorphous regions of the cellulose and not leading to hydrolysis of the cellulose, b) Addition of a thermoplastic polymer matrix chosen from among cellulose acetates, cellulose propionates, cellulose butyrates, cellulose acetate butyrates and mixtures thereof, c) Optionally, forming of the composite material obtained in the preceding step by hot molding, injection molding and/or hot compression.

Preferably, the partial acylation of cellulose fibers comprises:

activation of the amorphous regions of the cellulose fibers by alkaline treatment, contacting the treated cellulose fibers obtained from the preceding step with an acylation agent.

In a first embodiment, the activation of the amorphous regions of cellulose fibers by an alkaline treatment is done by impregnating the cellulose fibers with an alkaline aqueous solution of sodium hydroxide or potassium hydroxide.

In a second embodiment, the activation of the amorphous regions of cellulose fibers by an alkaline treatment is done by impregnating the cellulose fibers with potassium acetate or sodium acetate.

Preferably, the acylation agent is chosen from among acetic anhydride, butyric anhydride, propionic anhydride, mixed anhydrides, acetic acid chloride, propionic acid chloride, butyric acid chloride, activated acetates, activated propionates, activated butyrates and mixtures thereof.

In preferred embodiments, the cellulose fibers are chosen from among fibers of rayon, abaca, bamboo, hemp, coir from coconut, cotton from the seed, broom, Spanish broom, yucca, jute, kapok, kenaf, flax, manila, nettle, straw, ramie, raffia, sisal or mixtures thereof.

In the processes according to the invention, the cellulose fibers are preferably rayon fibers and the thermoplastic polymer matrix is preferably cellulose triacetate.

Preferably, step b) comprises the addition of 1% to 50% by weight of thermoplastic matrix with regard to the weight of the cellulose fibers.

Preferably, step b) comprises immersing the cellulose fibers in the form of braided yarn in the matrix, followed by drying the fibers.

Preferably, step b) comprises dispersing the cellulose fibers in the thermoplastic matrix.

In certain embodiments, the methods according to the invention also comprise a step of partial or total saponification of the cellulose-based composite material obtained in step b) or step c).

Preferably, saponification comprises treating the material with a solution of sodium hydroxide followed by washing and drying the material.

The invention also relates to a thermoplastic material based on cellulose that can be obtained by the methods according to the invention.

The invention also relates to thermostable cellulose-based composite materials that can be obtained by the methods according to the invention.

DESCRIPTION OF THE INVENTION

The invention therefore relates to production methods for various cellulose-based composites and notably cellulose/cellulose acetate composite materials and cellulose/cellulose composite materials.

Conventional acylation methods, and especially cellulose acetylation, use a strong acid as a catalyst such as sulfuric acid, perchloric acid or phosphoric acid, under these conditions, the acetylation and hydrolysis of the cellulose molecules then leads to a cellulose acetate soluble in various organic solvents such as chloroform and acetone, for example.

In the methods of the present invention, the mildest reaction conditions allow obtaining a selective acylation of the amorphous regions of the cellulose without hydrolysis of the glycosidic bonds of the cellulose molecules. In the methods according to the present invention, the integrity of the cellulose molecules and, in particular, the glycosidic bonds of the cellulose molecules, is conserved. This selective acetylation of the amorphous regions of the cellulose is not done in the presence of a catalyst such as a strong acid and consequently, a prior step of activating the amorphous regions of the cellulose fibers is generally required.

In the present invention, the acylation reaction is therefore conducted under neutral conditions and, in particular, under ionically neutral conditions. The acylation conditions are therefore neither acidic nor basic. Methods for selective acylation of the amorphous regions of the cellulose fibers while maintaining the integrity of the cellulose molecules have also been described in the prior art (Fraizy, 1966, Nagai et Sato, 1960).

This partial acylation of the cellulose fibers preserving the integrity of these cellulose molecules relies on the use of cellulose fibers having a large amorphous phase, since this phase is more reactive than the crystalline phase. Acylation under mild reaction conditions is consequently limited to acylation of the amorphous regions of the fiber leading to partial acylation of the cellulose without hydrolysis of the glycosidic bonds. The nearly complete absence of cellulose hydrolysis is illustrated by the fact that the acetylated cellulose fibers obtained according to the invention do not comprise the fraction extractable with solvents like chloroform or acetone corresponding to the cellulose acetate with the lowest DP and therefore soluble in these solvents.

In the present invention, it has now been discovered that these partially acylated fibers have exceptional complementarity with thermoplastic polymer matrices made of acylated cellulose. The composite materials thus obtained may be completely or partially saponified to lead to thermostable materials.

The invention therefore relates to novel composite materials consisting of two components having exceptional complementarity:
A fibrous reinforcing structure made up of cellulose fibers whose amorphous part was selectively acylated by low molecular weight fatty acids under mild conditions not leading to hydrolysis of the acyl chains of the cellulose thus produced. This selective acylation reduces the dimensional instability of the cellulose fibers and generates a high density of side chains of cellulose acyl.
A thermoplastic polymer matrix made up of matrices of completely soluble cellulose acyl with cellulose acyl chains present on the cellulose fibers.

Typically, acylation is done under neutral conditions, preserving the integrity of the glycosidic bonds of the cellulose molecules.

The invention also describes a variant of these novel composite materials where all or part of the acyl groups was eliminated by alkaline treatment in order to lead to a thermostable material.

The invention therefore relates to cellulose-based composite materials comprising:
Cellulose fibers comprising crystalline regions and at least 20% of amorphous regions, at least 80% of these amorphous regions being acylated by low molecular weight fatty acids chosen from among acetate, propionate, butyrate and mixtures thereof
A compatible thermoplastic polymer matrix chosen from among cellulose acetates, cellulose propionates, cellulose butyrates, cellulose acetate butyrates and mixtures thereof.

In the materials of the present invention, cellulose fibers are partially acylated under mild conditions (neutral conditions) leading to selective acylation of the amorphous regions of the cellulose without hydrolysis of the glycosidic bonds of the cellulose molecules.

In these preferred embodiments, the amorphous regions of cellulose fibers are selectively acetylated.

In the composite materials of the present invention, the cellulose fibers comprise at least 10, 20, 30 or 40% of amorphous regions. The cellulose fibers therefore have a degree of crystallinity less than 90, 80, 70 or 60%. The amorphous regions of the cellulose are acylated to at least 80%, 85% or 90%. In other embodiments, the amorphous regions of the cellulose fibers are completely acetylated.

All common paper fibers can be used in the materials and methods of the present invention.

In preferred embodiments, the cellulose fibers are chosen from among fibers of rayon, abaca, bamboo, hemp, coir from coconut, cotton from the seed, broom, Spanish broom, yucca, jute, kapok, kenaf, flax, manila, nettle, straw, ramie, raffia, sisal or mixtures thereof.

In preferred embodiments, the cellulose fibers are rayon and flax fibers.

In the materials of the present invention, the cellulose fibers have a degree of acylation comprised between 10% and 50% by weight and preferably comprised between 20% and 40% by weight.

Preferably, the cellulose fibers have a degree of acylation comprised between 10% and 50% by weight and preferably comprised between 20% and 40% by weight.

In advantageous embodiments, the cellulose fibers used in the materials of the present invention are rayon fibers having a degree of acylation, and preferably acetylation, comprised between 20% and 40% by mass.

The second component of the materials is a thermoplastic polymer matrix chosen from among cellulose acetates, cellulose propionates, cellulose butyrates, cellulose acetate butyrates and mixtures thereof.

"Thermoplastic matrix" means a matrix that melts or softens under the effect of heat. Typically the melting point of a thermoplastic material is less than its decomposition temperature.

Preferably, thermoplastic matrices are chosen from among the following matrices: cellulose triacetate, cellulose diacetate, cellulose tripropionate, cellulose acetate butyrate (CAB commercial product: 13.5% by mass of acetate and 38% by mass of butyrate, molar ratio around 1 acetate for 2 butyrates), cellulose tributyrate. Cellulose acetate butyrates include, in particular, CAB comprising 13.5% by mass of acetate and 38% by mass of butyrate (molar ratio around 1 acetate for 2 butyrates). This product is available commercially. These thermoplastic matrices are well known to the person skilled in the art.

Typically, these thermoplastic matrices have a sufficiently low DP to be soluble in organic solvents such as acetone or chloroform.

"Compatible" matrix means a soluble matrix with acyl chains of partially acylated cellulose fibers.

For partially acylated fibers with acetates, compatible matrices are chosen from, for example, cellulose triacetates and diacetates.

For partially acylated fibers with propionates, compatible matrices are chosen from, for example, cellulose propionates.

For partially acylated fibers with butyrates, compatible matrices are chosen from, for example, cellulose acetate butyrates and cellulose tributyrate.

In one embodiment of the invention, the cellulose-based composite material comprises rayon fibers with a degree of acetylation comprised between 20% and 40% by mass, preferably between 25% and 35% by mass and a cellulose triacetate matrix.

In another embodiment of the invention, the composite material comprises flax fibers with a degree of acylation with a mixture of acetate and butyrate (1 acetate for 2 butyrates) comprised between 30 and 50% by mass and acetate butyrate as a matrix, in particular CAB comprising 13.5% by mass of acetate and 38% by mass of butyrate.

The compatibility between the matrix and the fiber allows decreasing the quantity of matrix in the composite materials of the present invention.

Preferably, the composite materials comprise 1%, 5%, 10%, 20%, 30%, 40% to 50% by weight of thermoplastic matrix. Preferably, the composite materials according to the invention comprise less than 50%, 40%, 30%, 20%, 10% or less than 5% by weight of thermoplastic matrix.

The composite materials according to the invention thus comprise 50% 60%, 70%, 80%, 90% to 99% by weight of cellulose fibers. Preferably, the materials according to the invention comprise more than 50% 60%, 70%, 80%, 90% or more than 95% of partially acylated cellulose fibers.

The invention also relates to composite materials such as described above, partially or completely saponified. This saponification makes the composite material thermostable.

The invention also relates to production methods for a cellulose-based composite material comprising the following steps:

- Partial acylation of cellulose fibers by low molecular weight fatty acids chosen from among acetate, propionate, butyrate and mixtures thereof, said cellulose fibers comprising crystalline regions and at least 20% of amorphous regions, under mild reaction conditions leading to acetylation of at least 80% of the amorphous regions of the cellulose and not leading to hydrolysis of the cellulose,
- Addition of a compatible thermoplastic polymer matrix chosen from among cellulose acetates, cellulose propionates, cellulose butyrates, cellulose acetate butyrates and mixtures thereof,
- Optionally, forming of the composite material obtained in the preceding step by hot molding, injection molding and/or hot compression.

Typically, the acylation is done under neutral conditions, preserving the integrity of the glycosidic bonds of the cellulose molecules. Only previously activated amorphous regions of the cellulose are acylated in this step without hydrolyzing the cellulose.

The first step of the methods according to the invention is a step of partial acylation of the cellulose fibers and preferably a step of partial acetylation of the cellulose fibers.

In one preferred embodiment, the invention relates to production methods for a cellulose-based composite material comprising the following steps:

- Activation of cellulose fibers by alkaline treatment,
- Contacting the treated cellulose fibers obtained from the preceding step with an acylation agent,
- Addition of a compatible thermoplastic polymer matrix chosen from among cellulose acetates, cellulose propionates, cellulose butyrates, cellulose acetate butyrates and mixtures thereof,
- Optionally, forming of the composite material obtained in the preceding step by hot molding, injection molding and/or hot compression.

The cellulose fibers used in the methods of the present invention have an amorphous phase; preferably this amorphous region or phase represents at least 10%, 20%, 30% or 40% of the cellulose fibers.

The cellulose fibers have a degree of acylation comprised between 10% and 50% by mass and preferably comprised between 20% and 40% by mass.

Preferably, the cellulose fibers obtained have a degree of acetylation comprised between 10% and 50% by mass and preferably comprised between 20% and 40% by mass.

The partial acylation of cellulose fibers is done under mild conditions—typically neutral conditions—according to techniques known to the person skilled in the art. Partial acylation of cellulose fibers under these conditions selectively leads to acylation of the amorphous regions of cellulose fibers without hydrolysis of the cellulose.

Moreover, partial acylation under mild reaction conditions preserves the integrity of the cellulose molecules.

The partial acylation of cellulose fibers comprises a first step of activating the cellulose fibers by an alkaline treatment. This alkaline treatment may comprise impregnating the cellulose fibers with an alkaline aqueous solution of sodium hydroxide or potassium hydroxide. Alternatively, this alkaline treatment may comprise impregnating the cellulose fibers with potassium acetate or sodium acetate.

This activation is typically done by immersing or impregnating the fibers with a solution of potassium acetate having a concentration of 20% (g/g) at 60° C.-80° C.

After the alkaline treatment, the fibers are usually drained and dried according to the usual techniques.

Acylation is done by contacting the activated fibers with an acylation agent, preferably chosen from among acetic anhydride, butyric anhydride, propionic anhydride, mixed anhydrides, acetic acid chloride, propionic acid chloride, butyric acid chloride, activated acetates, activated propionates, activated butyrates and mixtures thereof.

This contact is done under neutral conditions and more particularly, under ionically neutral conditions. Catalysts such as strong acids are not used in this step.

This step comprises, for example, immersing previously activated fibers in acetic anhydride heated to 100° C. for a variable time comprised between several minutes and several hours. The degree of acetylation then varies as a function of the reaction time. After the reaction, the partially acetylated fibers are generally washed and then dried.

Preferably, the cellulose fibers are rayon fibers and their degree of acetylation is comprised between 25 and 35% by mass.

To obtain composite materials according to the invention, a compatible thermoplastic matrix is added to the fibers. These thermoplastic matrices based on cellulose are described above.

This step preferably comprises immersing the cellulose fibers in the form of braided yarn in the matrix followed by drying the fibers.

Preferably, acetylated fibers in the form of braided yarn are immersed in a triacetate solution (for example, a 5% solution in chloroform). After incubation, the fibers are removed, the excess solution is eliminated and the yarn is dried. The yarn obtained is much more rigid due to the cohesion between the fibers provided by the cellulose acetate.

In another embodiment, this step comprises dispersing the cellulose fibers in the matrix.

In a preferred embodiment, partially acetylated fibers are dispersed in a cellulose triacetate solution (2% cellulose triacetate solution in chloroform, for example). After evaporation, cellulose acetate films are obtained containing reinforcing fibers.

In advantageous embodiments, the cellulose fibers are partially acetylated rayon fibers and the thermoplastic polymer matrix is cellulose triacetate.

Preferably, the methods according to the invention comprise the addition of 1% to 50% by weight of thermoplastic matrix with regard to the weight of the cellulose fibers and preferably the addition of at least 50%, 40%, 30%, 20%, 10% or less than 5% by weight of thermoplastic matrix.

The composite materials obtained are distinguished by improved mechanical properties (measured by the Young's modulus) and by a decrease in water uptake (water sensitivity).

The invention also relates to a recycling process for a thermoplastic cellulose-based composite material in which the material is subjected to complete acetylation in the presence of a strong acid.

Cellulose-cellulose acetate composite materials have a low potential for biodegradation but may be completely recycled. Unlike other composite materials requiring separation of their components prior to recycling, the cellulose-thermoplastic matrix composite materials according to the present invention are directly and entirely recyclable, notably by complete acylation of the composite material. Two recycling routes can be considered: regeneration (alkaline treatment) when all the acyl groups are eliminated and the cellulose acetate of the composite material is transformed into cellulose or non-fibrous acetylation when the cellulose of the composite material is completely transformed into cellulose triacetate and the fibers lose their fibrous appearance.

For example, a cellulose-cellulose acetate composite according to the invention can be directly transformed into cellulose acetate in conventional industrial cellulose acetylation chains, which use acylation conditions called non-fibrous or homogenous. These use a strong acid as a catalyst such as sulfuric acid or perchloric acid and comprise two steps: pretreatment, during which the composite material, acetic acid, and the catalyst are intimately mixed with the addition of an acetylation reagent (acetic anhydride, for example) and the treatment itself, when the material reacts with the reagent added to the reaction medium. During the reaction, the cellulose of the composite material is transformed into cellulose acetate which is soluble in the reaction mixture. The acetate formed is then recovered by filtration, after its precipitation following the addition to the mixture of an aqueous solution of acetic acid. Such cellulose acylation methods have existed for a long time and are thoroughly described in the literature (Malm et al, (1946), Sassi and Chanzy (1995)). More recently, Barud et al. (2008), following the protocol used by Sassi and Chanzy (1995), acetylated bacterial cellulose and they obtained, for a reaction time ranging from 0.5 h to 24 h, degrees of substitution of 2.3 to 2.77.

Malm et al. (1946) clearly describe a non-fibrous acetylation protocol that uses sulfuric acid as a catalyst. According to them, 5-10% of sulfuric acid with regard to the cellulose is sufficient to achieve acetylation (43-44% of acetyl) in 1-3 h at 16-38° C. Thus, one part cellulose (at 5% humidity) is added to 2.4 parts of glacial acetic acid and the mixture is stirred for 1 hour at 38° C. Then, 4 parts of glacial acetic acid and 0.88% sulfuric acid (with regard to cellulose) are added and the mixture is stirred at the same temperature for another 45 minutes, before it is cooled to 18° C. After this, 2.7 parts of acetic anhydride and the remainder of the 6.12% sulfuric acid are added. The temperature is then gradually increased to 32-35° C. for 1.5 to 2 hours. At this stage of the reaction, the cellulose no longer has a fibrous structure. A mixture of one part water and two parts glacial acetic acid is then added to the reaction medium for one hour, in order to precipitate the cellulose acetate formed which is finally collected by filtration and then dried.

These well-known methods of cellulose acylation enable the composite materials according to the invention to be directly and completely recycled without prior separation of the components of the composite material.

In order to obtain materials with improved and thermostable mechanical properties, the processes according to the invention may also comprise a step of partial or complete saponification of the composite material described above. This saponification is done according to the usual techniques well-known to the person skilled in the art.

Preferably, saponification comprises treating the material with a solution of sodium hydroxide followed by washing and drying of the material.

Typically, the materials obtained are placed in a 0.5 N sodium hydroxide solution for 24 h at room temperature. The resulting materials are then washed and dried.

The invention also relates to thermoplastic composite materials that can be obtained by the methods according to the invention as well as the thermostable cellulose-based composite materials that can be obtained by the processes according to the invention.

FIGURES

Figure 2:
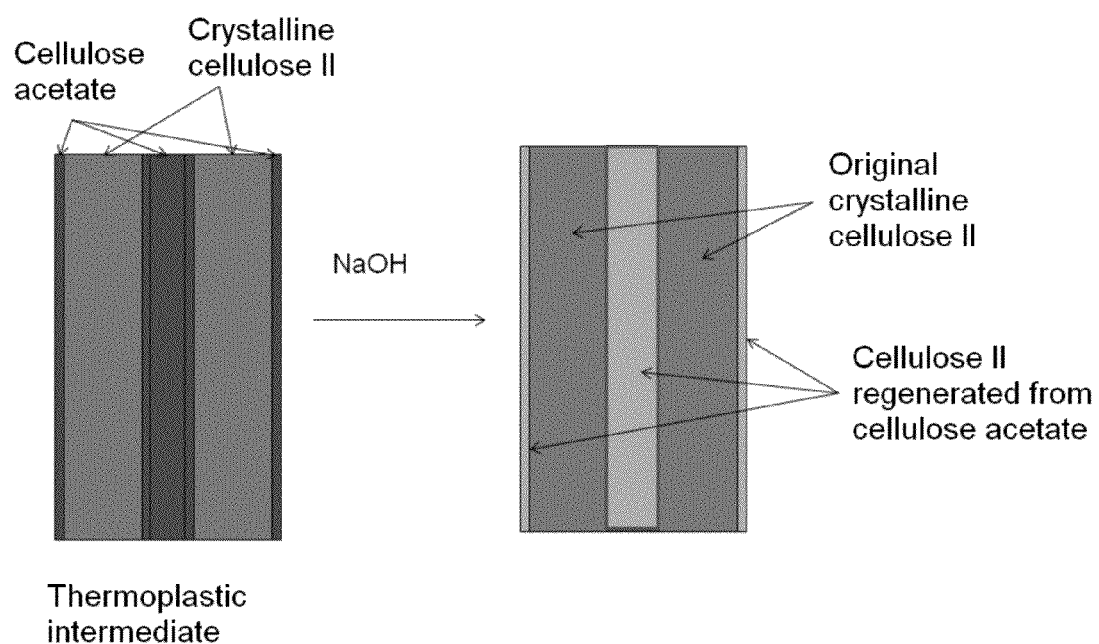

FIG. 1: Selective acetylation of the amorphous regions of cellulose fibers and formation of the composite with exogenous cellulose acetate FIG. 2: Alkaline treatment of composites of partially acetylated cellulose fibers/cellulose acetate to give a cellulose/cellulose composite

EXAMPLES

Example 1

Acetylation of Cellulose Fibers by the Potassium Acetate Method

Cellulose fibers are immersed in a solution of potassium acetate at 60-80° C., with a concentration of 20% (g/g), for 20 minutes. The activated fibers are drained and dried at 80° C. for 2 hours and 30 minutes. Then, they are immersed in acetic anhydride which is heated to 100° C. for 20, 40, 80 or 160 minutes. After reaction, the fibers are washed with hot water and acetone, and then dried at 105° C. for 24 h. The degree of acetylation is determined by weighing before and after acetylation according to the following formula:

$$\% \text{ acetate} = ((m_2 - m_1)/m_2)*100 \quad (1)$$

where:
- $m_1$ represents the mass of the rayon fibers before acetylation, in grams,
- $m_2$ represents the mass of the rayon fibers after acetylation, in grams, The results are shown in Table 1.

TABLE 1

Amount of acetate in the cellulose materials as a function of acetylation time

| Time (min) | Rayon fibers Amount of acetate (%) |
| --- | --- |
| 20 | 25 |
| 40 | 27 |
| 80 | 28 |
| 160 | 34 |

The amount of acetate is variable according to the reaction time. The maximum value corresponds to acetylation of the entire amorphous domain of the cellulose fibers.

Example 2

Washing Acetylated Fibers with Chloroform

Acetylated fibers prepared previously are thoroughly washed in the Socksley for 24 h with chloroform. The acetylated fibers are weighed before and after washing. The results are presented in the following table as a function of acetylation time.

TABLE 2

Extractable acetate determined for acetylated rayon fibers

| Time (min) | Extractable acetate (%) |
| --- | --- |
| 20 | 0 |
| 160 | 4 |

The results indicate that even with the maximum degree of acetylation, the quantity of extractable cellulose is very low.

Fibers washed with chloroform were analyzed by transmission IR spectrometry. The spectra of the acetylated fibers before and after washing with chloroform show a characteristic ester band at 1735 cm$^{-1}$ and are superimposable.

Example 3

Creating Acetylated Fiber/Cellulose Acetate Composites

Acetylated fibers in the form of braided yarn are immersed in a solution of 5% cellulose triacetate in chloroform. After incubation for one hour, the impregnated fibers are removed, the excess solution is eliminated and the yarn is dried at ambient temperature. The yarn obtained is much more rigid due to the cohesion between the fibers provided by the cellulose acetate. Control samples are prepared with non-acetylated yarn.

Example 4

Creating Compressed Acetylated Fiber Composites

Acetylated fibers in the form of braided yarn with degree of acetylation of 38% at most are compressed under 60 bars with a press at high temperature (250°). A very clear aggregation between the fibers is observed, reflecting the coalescence between the acetate domains of the fiber cellulose.

Example 5

Preparation of Cellulose Acetate-Rayon Fiber Films

Films of cellulose triacetate containing rayon fibers were obtained by dispersion of around 3 mg of virgin or acetylated rayon fibers in 1.5 ml of a solution of 2% CTA in chloroform. After evaporation, cellulose acetate films are obtained containing fibers.

The prepared samples were analyzed by optical microscope. The results obtained indicate that native rayon fibers are not at all dispersed in cellulose acetate, where they are present in the form of entangled fiber clusters. In contrast, acetylated fibers are able to disperse in this cellulose acetate matrix, even appearing to melt into this matrix. However, this is only an optical illusion, since extraction of the cellulose acetate matrix by chloroform regenerates the initial fibers. Analysis of the surface of the composite edge, acetylated fibers/cellulose acetate, under the electron microscope confirms a high-quality fiber/matrix interface.

Example 6

Obtaining Cellulose/Cellulose Composites by Saponification of Acetylated Fiber/Cellulose Acetate Composites The acetylated fiber/cellulose acetate composites previously obtained in Example 3 are placed in a 0.5 N NaOH solution for 24 h at room temperature. The resulting composites are then washed with distilled water and dried at 105° C. for 24 h.

Example 7

Analysis by Electron Microscopy

The results obtained by electron microscopy clearly show the cohesion between acetylated fibers and cellulose acetate. By comparison, non-acetylated fibers show little cohesion with cellulose acetate. The results are even more striking after saponification by cryofracture or after mechanical stretching. The extent of cohesion provided by acetylation of the fibers and then by co-crystallization of the cellulose acetate regions can be easily seen.

Example 8

Improvement of Thermoplastic and Thermostable Mechanical Properties

The Young's modulus was determined for different samples. Fiber acetylation improves the Young's modulus value both for acetylated fiber/cellulose acetate composites and cellulose/cellulose composites.
Fiber acetylation time=160 min
FNATAC=non-acetylated fibers+cellulose triacetate
FATAC=acetylated fibers+cellulose triacetate
FNATACR=non-acetylated fibers+cellulose triacetate after regeneration with sodium hydroxide
FATACR=acetylated fibers+cellulose triacetate after regeneration with sodium hydroxide

|  | Young's Modulus (GPa) | | | |
|---|---|---|---|---|
|  | FNATAC | FATAC | FNATACR | FATACR |
| 1 | 5.7 | 8.3 | 4.1 | 2.1 |
| 2 | 4.6 | 5.2 | 4.6 | 4.5 |
| 3 | 3.8 | 4.6 | 2.3 | 7.9 |
| 4 |  | 5.1 | 6.5 | 5.7 |
| 5 |  | 4.8 |  | 5.2 |
| Mean | 4.7 | 5.6 | 4 | 5.1 |
| Standard deviation | 1.0 | 1.5 | 2 | 2.1 |

Example 9

Reduction of Water Uptake of the Fibers after Partial Acetylation immersion time=19 h then pressing with a 2 kg cylinder

| acetylation time (min) | mass after conditioning (g) | mass after immersion in water (g) | water uptake (%) |
|---|---|---|---|
| 0 | 0.0063 | 0.0124 | 49 |
| 20 | 0.0171 | 0.0282 | 39 |
| 40 | 0.0203 | 0.0294 | 31 |
| 80 | 0.02 | 0.0297 | 33 |
| 160 | 0.0193 | 0.0278 | 31 |

These measurements are not very precise, but the reduction in water sensitivity induced by acetylation is very clear.

REFERENCES

Patent References

U.S. Pat. No. 2,535,919
U.S. Pat. No. 2,772,944
FR 519,822
DE 295 22 229
US 2003/0124937
GB 570,529

Other References

Zugenmaier, P. 2004. *Macromol. Symp.,* 208, 81-56
Cerqueira, D. A., et al. 2008. *Polym. Bull.,* 60, 397-404
Sassi, J.-F. 1995. CERMAV. Thesis
Dufresne, A. 2008. *Can J. Chem.,* 86, 484-494
Favier, V., Chanzy, H., et al. 1995. *Macromol.,* 28, 6365-6367
Hajji, P., et al. 1996. *Polym. Compos.,* 17, 612-619
Helbert, W., et al. 1996. *Polym. Compos.,* 17, 604-611
Petersson, L., et al. 2007. *Compos. Sci. Technol.,* 67, 2535-2544
Lönnberg, H., et al. 2008. *Eur. Polym. J.,* 44, 2991-2997
Ly, B., et al. 2008. *Compos. Sci. Technol.,* 68, 3193-3201
Fraizy, J. 1966. *Teintex,* 11, 781-790.
Nagai, K. and Saito, M. 1960. JP35013248
Kim, I. S., et al. 2002. U.S. Pat. No. 6,361,862B1.
Koh, J., et al. 2004. *J. Appl. Polym. Sci.,* 91, 3481-3488
Nishino, T. and Arimoto, N. 2007. *Biomacromol.,* 8, 2712-2714.
Malm C. J., Tanghe L. J. and Laird B. C., (1946) Preparation of cellulose acetate. Action of sulfuric acid. Ind. Eng. Chem. 38, 77-82.
Sassi J.-F. and Chanzy H., (1995) Ultrastructural aspects of the acetylation of cellulose, Cell 2, 111-127
Barud et al., 2008, Thermochimica Acta 471, 61-69

The invention claimed is:

1. Production method for a cellulose-based composite material, characterized in that it comprises the following steps:
    a) Providing cellulose fibers comprising crystalline regions and at least 20% of amorphous regions,
    b) Activation of the amorphous regions of the cellulose fibers by alkaline treatment,
    c) Selective acylation of the amorphous regions of the cellulose fibers by low molecular weight fatty acids chosen from among acetate, propionate, butyrate and mixtures thereof, under reaction conditions preserving the glycosidic bonds of the cellulose, until cellulose fibers having a degree of acylation comprised between 10% to 50% by mass are obtained,
    d) Addition of a thermoplastic polymer matrix chosen from among cellulose acetates, cellulose propionates, cellulose butyrates, cellulose acetate butyrates and mixtures thereof,
    e) Optionally, forming of the composite material obtained in the preceding step by hot molding, injection molding and/or hot compression,
        wherein the activation of cellulose fiber amorphous regions by alkaline treatment is done with potassium acetate or sodium acetate.

2. Production method for a cellulose-based composite material according to claim 1, characterized in that the activation of cellulose fiber amorphous regions by alkaline treatment is done with an aqueous alkaline solution of sodium hydroxide or potassium hydroxide.

3. Production method for a cellulose-based composite material according to claim 1, characterized in that the acylation of cellulose fiber amorphous regions comprises contacting the cellulose fibers with an acylation agent under neutral conditions.

4. Production method for a cellulose-based composite material according to claim 1, characterized in that the acylation agent is chosen from among acetic anhydrides, butyric anhydride, propionic anhydride, mixed anhydrides, acetic acid chloride, propionic acid chloride, butyric acid chloride, activated acetates, activated propionates, activated butyrates and mixtures thereof.

5. Production method for a cellulose-based composite material according to claim 1, characterized in that step d) comprises the addition of 1% to 50% by weight of thermoplastic matrix relative to the weight of the cellulose fibers.

6. Production method for a cellulose-based composite material according to claim 1, characterized in that step d) comprises immersing the cellulose fibers in the form of braided yarn in the matrix followed by drying the fibers.

7. Production method for a cellulose-based composite material according to claim 1, characterized in that step d) comprises dispersing the cellulose fibers in the thermoplastic matrix.

8. Production method for a cellulose-based composite material according to claim 1, characterized in that the cellulose fibers are chosen from among fibers of rayon, abaca, bamboo, hemp, coir from coconut, cotton from the seed, broom, Spanish broom, yucca, jute, kapok, kenaf, flax, manila, nettle, straw, ramie, raffia, sisal or mixtures thereof.

9. Production method for a cellulose-based composite material according to claim 1, characterized in that it comprises the following steps:
    a) Providing cellulose fibers comprising crystalline regions and at least 20% of amorphous regions,
    b) Activation of the amorphous regions of the cellulose fibers by alkaline treatment,
    c) Selective acylation of the amorphous regions of the cellulose fibers by low molecular weight fatty acids chosen from among acetate, propionate, butyrate and mixtures thereof, under reaction conditions preserving the glycosidic bonds of the cellulose, until cellulose fibers having a degree of acylation comprised between 10% to 50% by mass are obtained,
    d) Addition of a thermoplastic polymer matrix chosen from among cellulose acetates, cellulose propionates, cellulose butyrates, cellulose acetate butyrates and mixtures thereof,
    e) Optionally, forming of the composite material obtained in the preceding step by hot molding, injection molding and/or hot compression,
    characterized in that the cellulose fibers are rayon fibers and the thermoplastic polymer matrix is cellulose triacetate.

10. Production method for a cellulose-based composite material according to claim 1, characterized in that it comprises the following steps:
    a) Providing cellulose fibers comprising crystalline regions and at least 20% of amorphous regions,
    b) Activation of the amorphous regions of the cellulose fibers by alkaline treatment,
    c) Selective acylation of the amorphous regions of the cellulose fibers by low molecular weight fatty acids chosen from among acetate, propionate, butyrate and mixtures thereof, under reaction conditions preserving the glycosidic bonds of the cellulose, until cellulose fibers having a degree of acylation comprised between 10% to 50% by mass are obtained,
    d) Addition of a thermoplastic polymer matrix chosen from among cellulose acetates, cellulose propionates, cellulose butyrates, cellulose acetate butyrates and mixtures thereof,
    e) Optionally, forming of the composite material obtained in the preceding step by hot molding, injection molding and/or hot compression,
    characterized in that it also comprises a step of partial or total saponification of the cellulose-based composite material obtained in step d) or step e).

11. Production method for a cellulose-based composite material according to claim 10, characterized in that saponification comprises treatment of the material with a sodium hydroxide solution followed by washing and drying of the material.

12. Thermoplastic cellulose-based composite material that can be obtained by the method according to claim 1.

13. Recycling method for a thermoplastic cellulose-based composite material that can be obtained by
   a) Providing cellulose fibers comprising crystalline regions and at least 20% of amorphous regions,
   b) Activation of the amorphous regions of the cellulose fibers by alkaline treatment,
   c) Selective acylation of the amorphous regions of the cellulose fibers by low molecular weight fatty acids chosen from among acetate, propionate, butyrate and mixtures thereof, under reaction conditions preserving the glycosidic bonds of the cellulose, until cellulose fibers having a degree of acylation comprised between 10% to 50% by mass are obtained,
   d) Addition of a thermoplastic polymer matrix chosen from among cellulose acetates, cellulose propionates, cellulose butyrates, cellulose acetate butyrates and mixtures thereof,
   e) Optionally, forming of the composite material obtained in the preceding step by hot molding, injection molding and/or hot compression, characterized in that the material is subjected to complete acetylation in the presence of a strong acid.

14. Thermostable cellulose-based composite material that can be obtained by the method according to claim 10.

* * * * *